(12) United States Patent
Aspen

(10) Patent No.: US 10,914,048 B2
(45) Date of Patent: Feb. 9, 2021

(54) HEIGHT ADJUSTABLE METER/DEVICE PIT

(71) Applicant: A. Y. McDonald Mfg. Co., Dubuque, IA (US)

(72) Inventor: Randal S. Aspen, Lebanon, TN (US)

(73) Assignee: A. Y. McDonald Mfg. Co., Dubuque, IA (US)

(*) Notice: Subject to any disclaimer, the term of this patent is extended or adjusted under 35 U.S.C. 154(b) by 342 days.

(21) Appl. No.: 15/850,860

(22) Filed: Dec. 21, 2017

(65) Prior Publication Data
US 2019/0194900 A1 Jun. 27, 2019

(51) Int. Cl.
*E02D 29/12* (2006.01)
*E02D 29/14* (2006.01)
*E03B 7/09* (2006.01)

(52) U.S. Cl.
CPC ......... *E02D 29/121* (2013.01); *E02D 29/125* (2013.01); *E02D 29/14* (2013.01); *E03B 7/095* (2013.01); *E02D 2200/115* (2013.01); *E02D 2300/0006* (2013.01); *E02D 2300/0045* (2013.01)

(58) Field of Classification Search
CPC ....... E02D 29/12; E02D 29/121; E02D 29/14; E02B 7/095
USPC ..................................................... 220/484, 8
See application file for complete search history.

(56) References Cited

U.S. PATENT DOCUMENTS

| | | | | |
|---|---|---|---|---|
| 4,230,234 A | * | 10/1980 | Taylor | E02D 29/12 220/3.7 |
| 6,061,975 A | * | 5/2000 | Craft, Jr. | H02G 9/10 220/484 |
| 6,164,131 A | * | 12/2000 | Edwards | G01F 15/10 220/484 |

OTHER PUBLICATIONS

The "Crescent" Meter Box, the Ford Meter Box Co., Wabash, Indiana, Bulletin 112, Jan. 15, 1922.
"Ford Meter Boxes", The Ford Meter Box Company, Inc., Section C, Sep. 2014.

* cited by examiner

*Primary Examiner* — Steven A. Reynolds
*Assistant Examiner* — Javier A Pagan
(74) *Attorney, Agent, or Firm* — Wood, Phillips, Katz, Clark & Mortimer

(57) ABSTRACT

A height adjustable device pit (10) is provided for use in installing water meters (12) or other equipment below ground level. The device pit (10) includes a lower housing section (14), an upper housing section (16), and a lid (18). The lower housing section (14) and the upper housing section (16) are engaged with each other by mating screw threads (20) and (22) that are centered on a vertical, longitudinal axis (24). The housing sections (14,16) are movable relative to each other along the longitudinal axis (24) to adjust the vertical height of the device pit (10) in response to relative rotation of the housing sections (14) and (16) about the longitudinal axis (24).

10 Claims, 4 Drawing Sheets

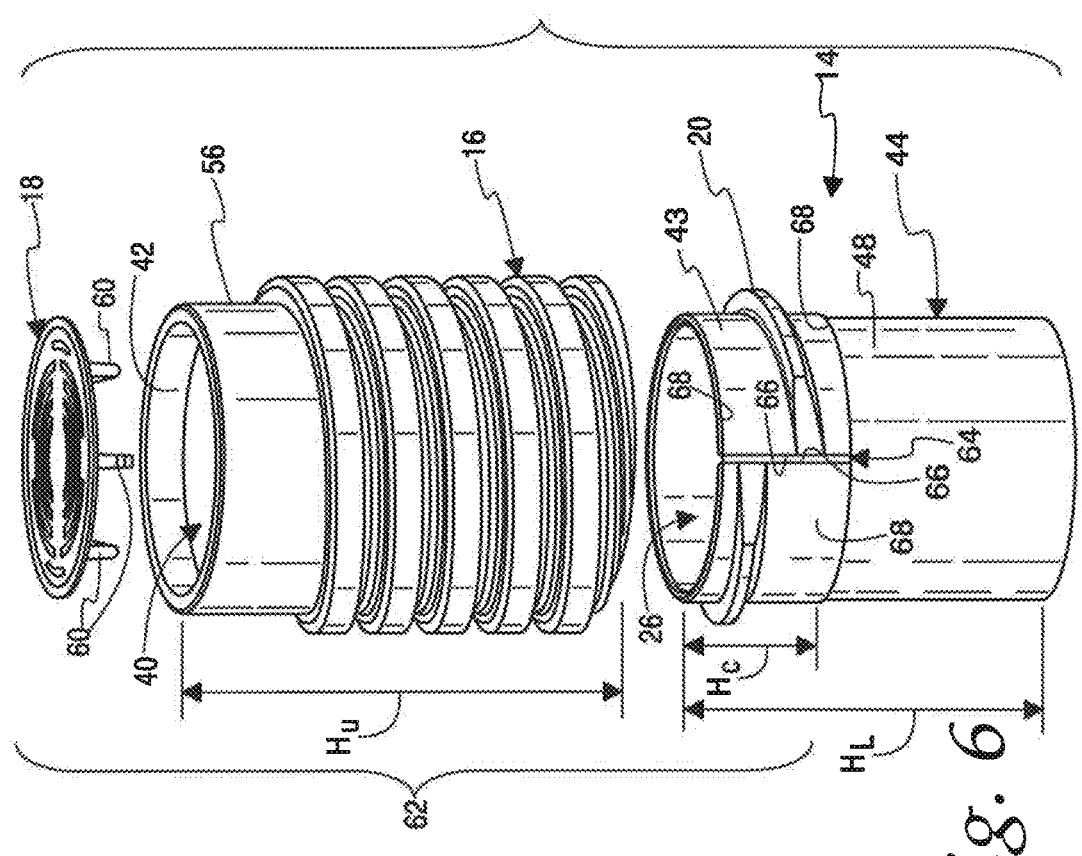
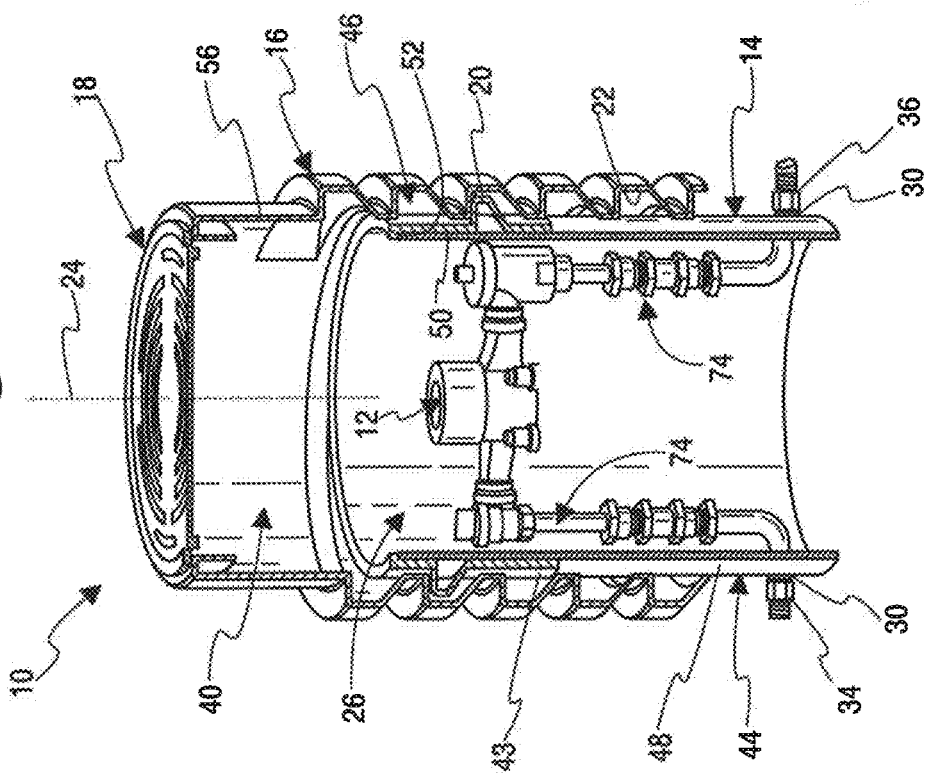

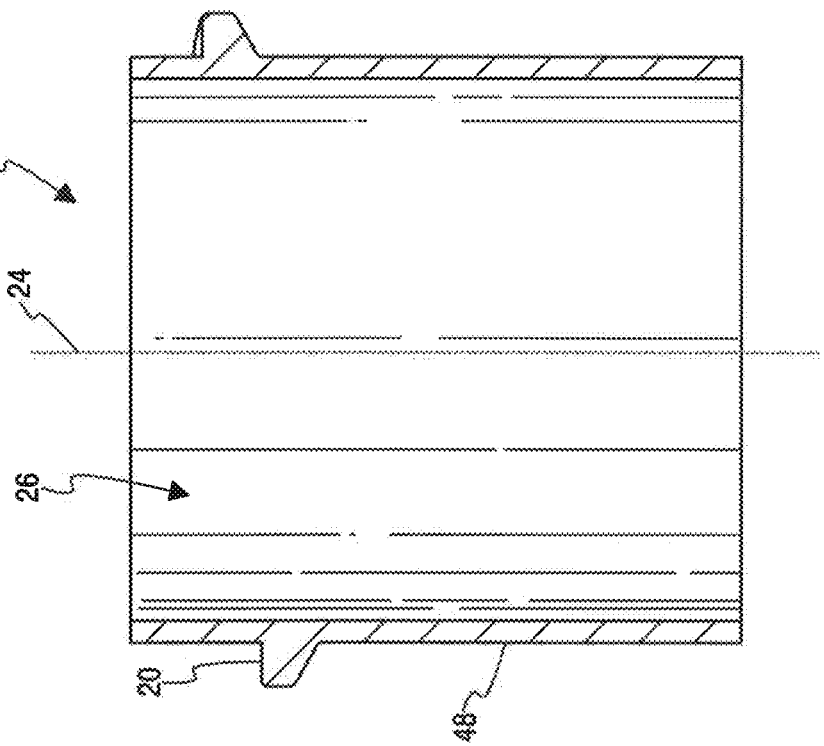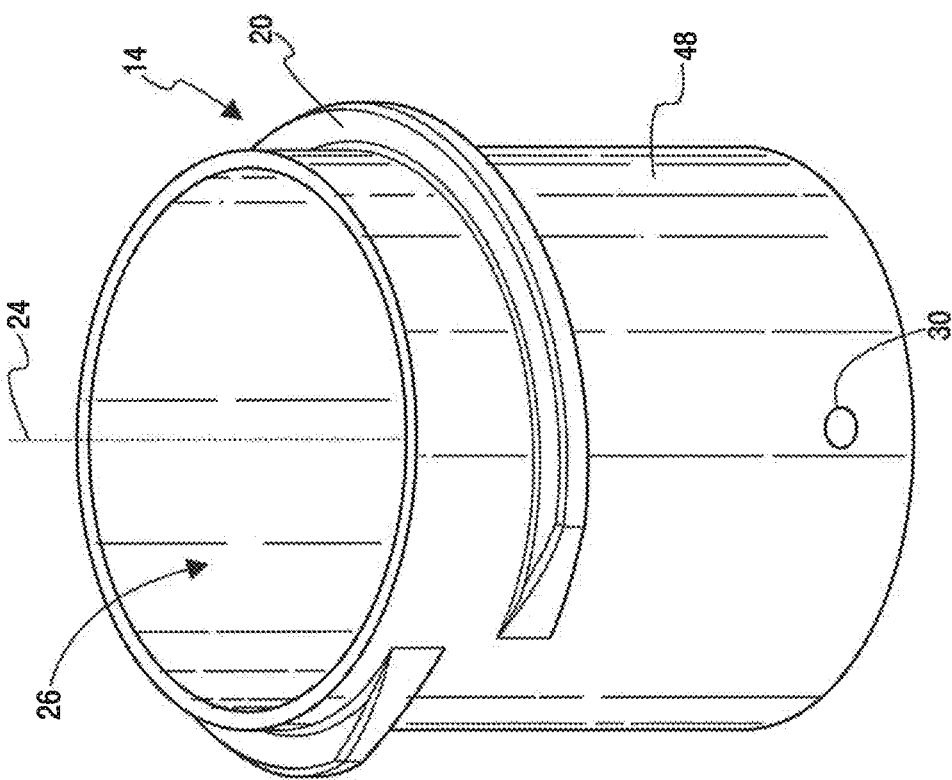

HEIGHT ADJUSTABLE METER/DEVICE PIT

CROSS-REFERENCE TO RELATED APPLICATIONS

Not Applicable.

FEDERALLY SPONSORED RESEARCH OR DEVELOPMENT

Not Applicable,

MICROFICHE/COPYRIGHT REFERENCE

Not Applicable,

FIELD OF THE INVENTION

This application relates to device pits that allow installation and access to equipment that is installed below ground level, typically to avoid below freezing temperatures that may negatively impact the equipment, and in more particular applications to meter pits, such as water meters pits that are utilized to install and access water meters below ground level.

BACKGROUND OF THE INVENTION

It is known to utilize a "device pit" to allow access and installation of utility service equipment, such as water service equipment, below ground level. While devices can be installed below ground level for purposes of aesthetics or because an underground installation is preferred or more convenient in view of local codes or other constraints, device pits are more often utilized to protect the equipment from the local environment, particularly freezing temperatures. In this regard, in areas that experience below freezing temperatures on a regular basis, equipment such as water lines and other associated water conveying devices such as water meters, pumps, pump controls, pressure regulating devices, pressure relief valves, etc., are often installed at a depth below ground sufficient to prevent the water in the water lines and other equipment from freezing, which serves to protect the water lines and other equipment from bursting or otherwise malfunctioning. Device pits, such as water meter pits, are used in such areas to install water meters and other devices at the necessary depth below ground while allowing access to the water meters or other devices for repair or replacement. One common problem is that the required depth varies from geographical area to geographical area, and, more importantly, can further vary depending upon the final grade of the ground level surrounding the meter pit, which is typically not known until well after the meter pit is installed. This can result in a meter pit that is either too tall or too short for the final grade. Accordingly, there is a need for height adjustable meter/device pits. This concern can apply to any device pit, including those that are utilized to allow access and/or installation of devices that are not related to water service.

Meter pits have been proposed that have the capability for the height to be adjusted to conform the height of the meter pit to the final grade of the ground level surrounding the meter pit. While many of these proposed adjustable height meter pits may be suitable for their intended purpose, there is always room for improvement, including improvements in simplicity of construction, simplicity of adjustment, and the adaptability of the adjustment to the surrounding ground level.

SUMMARY OF THE INVENTION

In accordance with one feature of the invention, a height adjustable device pit is provided for use in installing equipment below ground level. The device pit includes a lower housing section and an upper housing section engaged with each other by mating screw threads that are centered on a longitudinal axis, the housing sections being moveable relative to each other along the longitudinal axis for height adjustment of the device pit in response to relative rotation of the housing section about the longitudinal axis. The lower housing section defines a chamber for receiving at least one device and includes at least one opening sized to allow a service line located outside of the chamber to be connected to the at least one device received in the chamber. The upper housing defines an access passage to allow a worker to access the chamber in the lower housing.

In accordance with one feature of the invention, a height adjustable meter pit is provided for use in installing a water meter below ground level. The meter pit includes a lower housing section and an upper housing section engaged with each other by mating screw threads that are centered on a longitudinal axis, the housing sections being moveable relative to each other along the longitudinal axis for height adjustment of the meter pit in response to relative rotation of the housing sections about the longitudinal axis. The lower housing section defines a chamber for receiving a water meter and includes a pair of openings, each opening sized to allow a water line located outside of the chamber to be connected to a water meter received in the chamber. The upper housing defines an access passage to allow a worker to access the chamber in the lower housing.

As one feature, the mating screw threads include an external screw thread on an outermost surface of one of the housing sections and an internal screw thread on the other of the housing sections.

In one feature, the external screw thread is on the lower housing section and the internal screw threads are on the upper housing section.

According to one feature, the upper housing section has a height $H_U$ parallel to the longitudinal axis and the internal screw threads extend over a majority of the height $H_U$, and the lower housing section has a height $H_L$ parallel to the longitudinal axis and the external screw threads extend over a minority of the height $H_L$.

As one feature, the lower housing section includes a cylindrical housing component and an external screw thread component mounted on an exterior surface of the cylindrical housing component, the external screw thread component defining the external screw thread.

In one feature, at least one of the upper housing section and the lower housing section is a one-piece unitary component.

According to one feature, the internal screw thread defines at least a portion of the access passage.

As one feature, a portion of the upper housing section is defined by a cylindrical wall having an inwardly facing cylindrical surface defining at least a portion of the access passage.

In one feature, the internal thread is defined in a portion of the upper housing section located below the cylindrical wall.

According to one feature, the access passage includes an upwardly facing access opening in the upper housing.

As one feature, a lid is removably received in the access opening.

In one feature, each of the openings of the pair of openings is a circular hole in an exterior wall of the lower housing.

According to one feature, a device pit retrofit kit is provided for use in retrofitting an existing device pit to provide a height adjustable device pit. The retrofit kit includes a tubular-shaped retrofit component configured to be mounted on an existing device pit. The retrofit component has a radially inwardly facing, cylindrical-shaped mount surface centered on a longitudinal axis, and an external screw thread centered on the longitudinal axis. The mount surface is sized to closely conform to an external surface of the existing device pit. An upper housing section has an internal screw thread configured for threaded engagement with the external screw thread to provide relative movement between the upper housing section and the retrofit component along the longitudinal axis in response to the upper housing section being rotated relative to the retrofit component. The upper housing defines an access passage to allow a worker to access the existing meter pit after the retrofit kit is installed on the existing device pit.

In one feature, the retrofit component includes an annular shoulder extending radially inwardly from the mount surface for engagement with an upwardly facing annular surface on the existing device pit.

According to one feature, the upper housing section has a height $H_U$ parallel to the longitudinal axis and the internal screw thread extends over a majority of the height $H_U$.

As one feature, the internal screw thread defines at least a portion of the access passage.

In one feature, a portion of the upper housing section is defined by a cylindrical wall having an inwardly facing cylindrical surface defining at least a portion of the access passage.

According to one feature, the internal thread is defined in a portion of the upper housing section located below the cylindrical wall.

As one feature, the access passage includes an upwardly facing access opening in the upper housing.

In one feature, a lid is removably received in the access opening.

Other objects, features, and advantages of the invention will become apparent from a review of the entire specification, including the appended claims and drawings.

BRIEF DESCRIPTION OF THE DRAWINGS

FIG. 5 is a view similar to FIG. 2, but showing an alternate water meter placement/mounting within the meter pit;

FIG. 6 is an exploded view of the meter pit shown in FIGS. 1-5; and

FIG. 7 is a perspective view of an alternate embodiment of a lower housing section of the adjustable meter pit according to the invention; and FIG. 8 is a section view of the lower housing section of FIG. 7.

DETAILED DESCRIPTION OF THE PREFERRED EMBODIMENT

Figure 2:
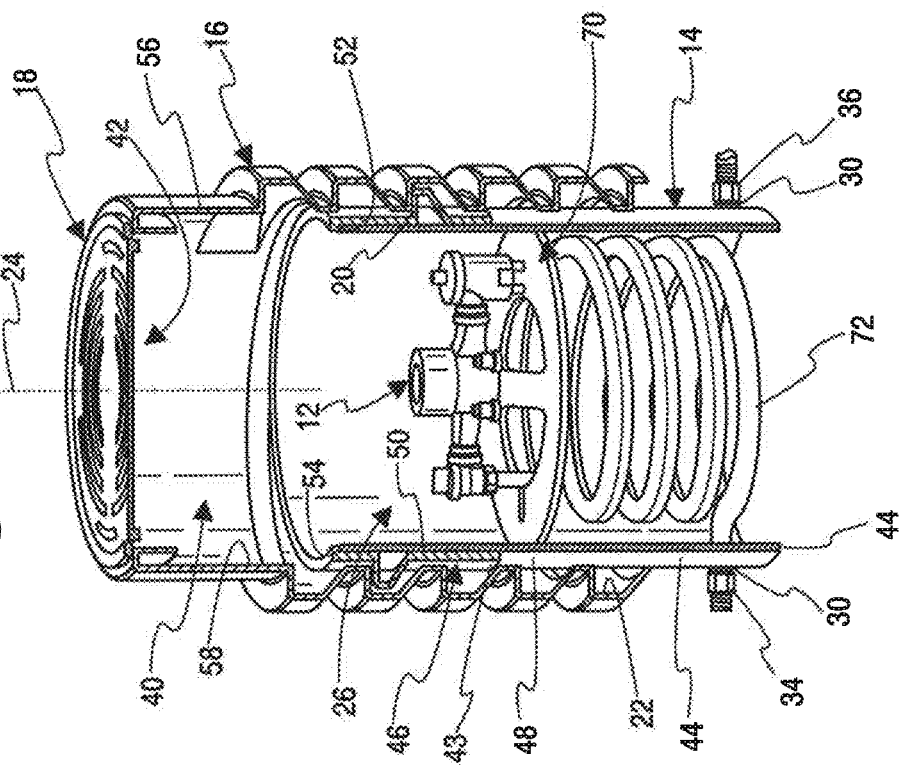
FIG. 2 is a view similar to FIG. 1, but showing a portion of the meter pit broken away in order to reveal a first example of a water meter placement therein.
Figure 1:
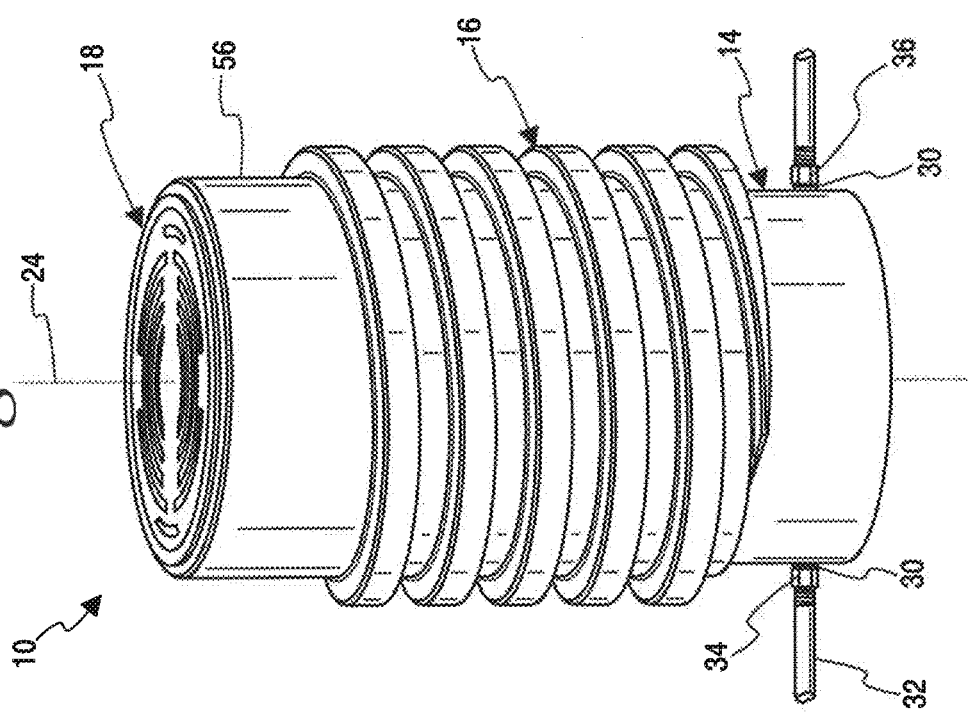
FIG. 1 is a perspective view of an adjustable meter pit according to the invention showing the pit adjusted to a first height, with inlet and outlet water lines leading to and from the meter pit.
Figure 4:
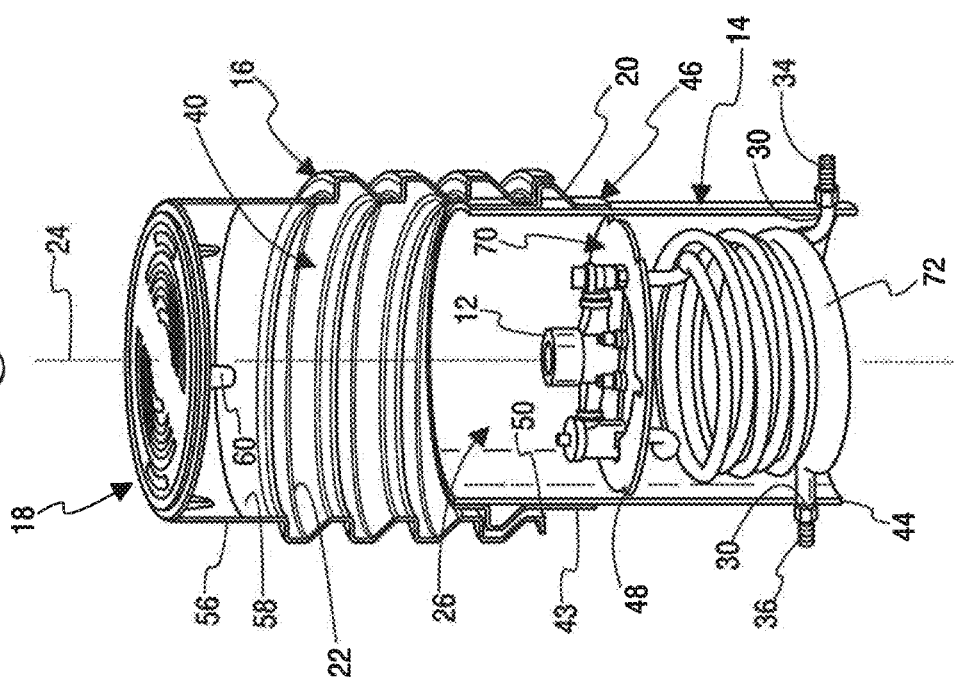
FIGS. 3 and 4 are views similar to FIGS. 1 and 2, but showing the meter pit adjusted to a taller height than that shown in FIGS. 1 and 2.
Figure 3:
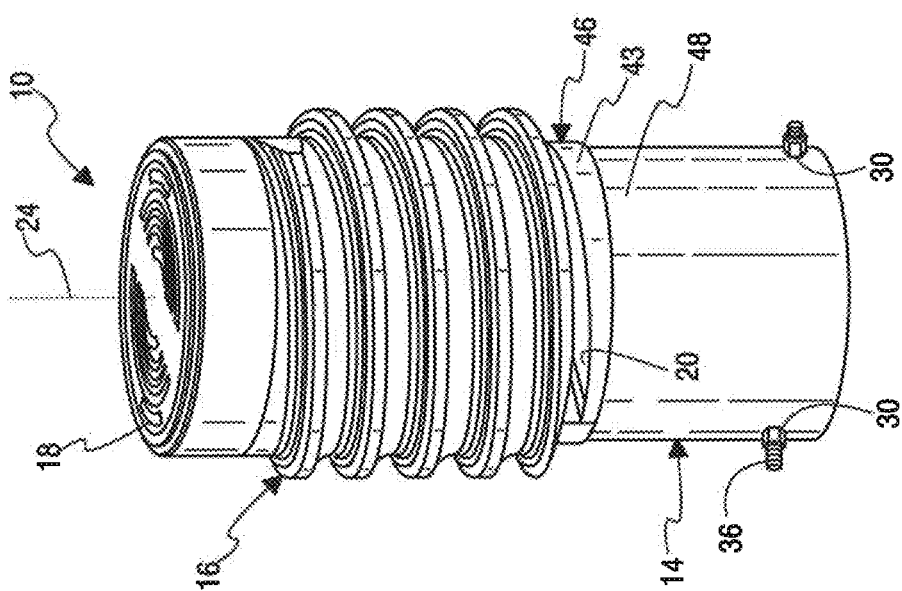

A height adjustable device pit is show in FIGS. 1-8 in the form of a meter pit 10 that is provided for use in installing a water meter 12 below ground level. The meter pit 10 includes a lower housing section 14, an upper housing section 16, and a lid 18. The lower housing section 14 and the upper housing section 16 are engaged with each other by mating screw threads 20 and 22 that are centered on a vertical, longitudinal axis 24. The housing sections 14,16 are movable relative to each other along the longitudinal axis 24 to adjust the vertical height of the meter pit 10 in response to relative rotation of the housing sections 14 and 16 about the longitudinal axis 24. This relative rotation results in relative rotation of the screw threads 20 and 22 which forces the upper housing section 16 to more vertically along the axis 24 relative to the lower housing section 14.

The lower housing section 14 defines a chamber 26 for receiving the water meter 12 and includes a pair of openings 30 sized to allow a water service line 32 located outside of the chamber 26 to be connected to the water meter 12. In this regard, one of the openings 30 receives a water inlet 34, and the other opening 30 receives a water outlet 36. In the illustrated embodiment, the openings 30 are provided in the form of circular holes in the exterior wall of the lower housing. The upper housing section 16 defines an access passage 40 to allow a worker to access the chamber 26 in the lower housing 14. The access passage 40 includes an upwardly facing access opening 42 that can be selectively closed or opened by the lid 18.

In the illustrated embodiment, the mating screw threads 20 and 22 are provided in the form of an external screw thread 20 on an outermost surface 43 of the lower housing section 14, and an internal screw thread 22 formed on the upper housing section 16. In the illustrated embodiment, the lower housing section 14 is shown as being a two piece construction that includes a cylindrical housing component or pipe 44 and an external screw thread component 46 that is mounted on an exterior cylindrical surface 48 of the pipe 44. The surface 48 is centered on the longitudinal axis 24. The inlet and outlet openings 30 are located in the pipe 44 and the external screw thread 20 is defined on the external screw thread component 44. The external screw thread component 46 includes a radially inwardly facing cylindrical-shaped mount surface 50 that is centered on the longitudinal axis 24 and sized to closely conform to the exterior surface 48 of the pipe 44 so that the screw thread component 46 can be mounted to the exterior surface 48 of the pipe 44. In the illustrated embodiment, the external screw thread component 46 includes a downwardly facing annular shoulder 52 extending radially inwardly from the mount surface 50 for engagement with an upwardly facing annular surface 54 on the pipe 44 to improve the structural integrity of the mount connection between the component 46 and the pipe 44. In the illustrated embodiment, the component 46 is preferably molded from a suitable material, such as a suitable polymer or composite material.

In the illustrated embodiment, the upper housing section 16 is a one piece, unitary component, that is preferably molded from a suitable material, such as a suitable composite or polymer material. A portion of the upper housing section 16 is defined by a cylindrical wall 56 having an inwardly facing cylindrical surface 58 that defines a portion of the access passage 40, with a remainder of the access passage 40 being defined by the internal screw thread 22 in the illustrated embodiment. The internal screw thread 22 is defined in a portion of the upper housing section 16 that is located below the cylindrical wall 56. As best seen in FIG. 6, the access opening 42 in the upper housing section 16 is sized to receive a plurality of circumferentially spaced, locating tab surfaces 60 on the lid 18, so that the lid 18 can be removably received in the access opening 42.

In the illustrated embodiment, the upper housing section 16 has a height $H_U$ parallel to the longitudinal axis 24 and the internal screw threads 22 extend over a majority of the height $H_U$. The lower housing section 14 has a height $H_L$ parallel to the longitudinal axis 24 and the external screw thread 20 extends over a minority of the height $H_L$. The external screw thread component 46 has a height $H_U$ and the external thread 20 extends over a majority of the height $H_U$.

It should be understood that the upper housing section 16, the lid 18, and the external screw thread component 46 can be provided as a retrofit kit 62, with the external screw thread component 46 serving as a retrofit component 46 that can be mounted to an existing meter pit when the existing meter pit has an upper portion with a cylindrical exterior surface of a compatible size. For purposes of the retrofit kit 62, the existing meter pit stands in place of the tube 44.

As best seen in FIG. 6, in the illustrated embodiment, the external screw thread component 46 has a discontinuity 64 in the circumferential direction defined by two end surfaces 66 which allows the component 46 to be adjusted for manufacturing variations in the size of an existing meter pit or the pipe 44 and its external cylindrical surface 48. The external screw thread component 46 can be fixed to the pipe 44, or to an existing meter pit, using any suitable means, including any suitable bonding material, and/or any suitable fastener, including any suitable threaded fasteners or rivets 68.

It should be understood that the disclosed meter pit 10 can be compatible with any type of water meter and meters other than water meters. Furthermore, it should be understood that the disclosed meter pit 10 can be compatible with any mounting or connection configuration commonly employed with meters. In this regard, FIG. 2 shows the meter pit 10 used in connection with a water meter 12 that is mounted to a vertically movable platform 70, with the meter 12 being connected to the inlet 34 and the outlet 36 by a flexible water conduit or tube 72. As a further example, with reference to FIG. 5, the meter pit 10 is shown in connection with a water meter 12 that utilizes conventional, nonflexible pipe/tubing/fittings 74 to connect the water meter 12 to the inlet 34 and outlet 36.

The two options discussed above are intended to be illustrative of the many possible uses of the disclosed device pit 10. For example, the device pit 10 could be utilized to allow access and/or installation for two meters that are mounted in tandem, with one inlet split between two outlets. As another example, the disclosed device pit 10 can be utilized to provide access to any device that may be mounted below ground level, including, for example, other types of meters, pumps, pump controls, and valves, and devices associated with electrical power service and/or communications service.

It should be understood that while preferred forms of the device pit 10 have been shown and described herein, this disclosure contemplates other forms for the device pit 10. For example, while is it preferred that the upper housing section 16 and the external screw thread component 46 be formed by molding, in some applications it may be desirable for these components to be formed by other suitable manufacturing techniques and/or out of other suitable materials. As a further example, while in the illustrated embodiment the upper housing 16 is shown as including the cylindrical wall 56, in some applications it may be desirable for the internal screw thread 22 to extend from the top of the upper housing section 16 to the bottom of the upper housing section 16, with the entirety of the access passage 40 being defined by the internal screw threads 22. As a further example, while in the illustrated embodiment of FIGS. 1-6, the lower housing section 14 is shown as a two component construction, in some applications it may be desirable for the lower housing section 14 to be provided as a unitary, one piece component wherein the external thread 20 is defined on the exterior surface 48, as best seen in FIGS. 7 and 8. As yet another example, while the openings 30 are shown as being circular through holes in the embodiments illustrated herein, in some applications it may be desirable for the openings 30 to have other forms, including for the openings 30 to be provided in the form of slots that extend upwardly from the bottommost edge of the tube 44. As a further example, while only two of the openings 30 have been shown, more than two, or less than two can be provide depending upon the particular configuration and type of equipment or device that is installed in the equipment/device pit 10. Similarly, the shape and configuration of the openings 30 may take any desired form depending upon the particular type of equipment/device mounted in the pit 10 and the type of underground service lines to which it is to be connected. As yet another example, while the lid 18 is shown as including the plurality of circumferentially spaced tab surfaces 62, in some applications, it may be desirable for the tab surfaces 62 to be replaced by a continuous cylindrical wall surface that conforms to the access opening 60 in the upper housing section 16. Accordingly, it should be understood that no limitation to a specific configuration or geometry is intended unless expressly recited in one of the appended claims.

The invention claimed is:

1. A height adjustable meter pit for use in installing a fluid meter below ground level, the meter pit comprising:
    a lower housing section having an upper end and lower end and cylindrical around a longitudinal axis, and including
        a cylindrical outer surface with a first diameter, and
        a first spiral screw thread
            adjacent the lower housing section upper end, and
            extending outwardly from said lower housing section cylindrical outer surface to a second diameter greater than said first diameter,
            wherein said first spiral screw thread extends about one full rotation around the lower housing section;
    an upper housing section having
        a cylindrical inner surface with a third diameter, said third diameter being greater than said first diameter and less than said second diameter, and
        a second spiral screw thread
            defined by a spiral groove in the upper housing section cylindrical inner surface, and
            mating with said first spiral screw thread,
            wherein the bottom of said groove has a fourth diameter greater than said second diameter;
    wherein the housing sections are moveable relative to each other along the longitudinal axis for height adjustment of the meter fluid pit in response to rotation of the upper housing section about the longitudinal axis, the lower housing section defines a chamber for receiving at least one fluid meter and including a pair of openings, each opening sized to allow a fluid line located outside of the chamber to be connected to a fluid meter received in the chamber, and the upper housing section is removable from the lower housing section by rotating said upper housing section to disengage the first and second spiral screw threads to allow a worker to access the chamber in the lower housing section.

2. The meter pit of claim 1, wherein said second spiral screw thread winds around said upper housing section a plurality of times and extends between upper and lower ends of said upper housing section, said second spiral screw thread being open on its lower end.

3. The meter pit of claim 1, wherein said first spiral screw thread extends no more than about one full rotation around the lower housing section.

4. The meter pit of claim 1, wherein said upper housing section has a longitudinal depth, and a platform is supported within said lower housing section at a selected depth beneath the upper end of the lower housing section which is less than said upper housing section longitudinal depth.

5. The meter pit of claim 4, wherein the fluid meter is on said platform and further comprising a coiled fluid conduit connecting said fluid line extending through said pair of openings with the fluid meter.

6. The meter pit of claim 1, wherein said upper housing section has a longitudinal depth less than the depth of the lower housing section pair of openings beneath the upper end of the lower housing section.

7. A height adjustable meter pit for use in installing a fluid meter below ground level, the meter pit comprising:

a lower housing section having an upper end and lower end and cylindrical around a longitudinal axis, and including a cylindrical outer surface with a first diameter, and a first spiral screw thread adjacent the lower housing section upper end, and extending outwardly from said lower housing section cylindrical outer surface to a second diameter greater than said first diameter, wherein said first spiral screw thread extends no more than about one full rotation around the lower housing section;

an upper housing section having a cylindrical inner surface with a third diameter, said third diameter being greater than said first diameter and less than said second diameter, and a second spiral screw thread defined by a spiral groove in the upper housing section cylindrical inner surface, and mating with said first spiral screw thread, wherein the bottom of said groove has a fourth diameter greater than said second diameter, and said second spiral screw thread winds around said upper housing section a plurality of times and extends between upper and lower ends of said upper housing section, said second spiral screw thread being open on its lower end;

wherein the housing sections are moveable relative to each other along the longitudinal axis for height adjustment of the meter fluid pit in response to rotation of the upper housing section about the longitudinal axis, the lower housing section defines a chamber for receiving at least one fluid meter and including a pair of openings, each opening sized to allow a fluid line located outside of the chamber to be connected to a fluid meter received in the chamber, and the upper housing section is removable from the lower housing section by rotating said upper housing section to disengage the first and second spiral screw threads to allow a worker to access the chamber in the lower housing section.

8. The meter pit of claim 7, wherein said upper housing section has a longitudinal depth, and a platform is supported within said lower housing section at a selected depth beneath the upper end of the lower housing section which is less than said upper housing section longitudinal depth.

9. The meter pit of claim 8, wherein the fluid meter is on said platform and further comprising a coiled fluid conduit connecting said fluid line extending through said pair of openings with the fluid meter.

10. The meter pit of claim 8, wherein said upper housing section longitudinal depth is less than the depth of the lower housing section pair of openings beneath the upper end of the lower housing section.

* * * * *